United States Patent
Yi

(10) Patent No.: US 12,534,943 B2
(45) Date of Patent: Jan. 27, 2026

(54) DOOR HANDLE ASSEMBLY

(71) Applicant: Illinois Tool Works Inc., Glenview, IL (US)

(72) Inventor: Penghui Yi, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 141 days.

(21) Appl. No.: 18/236,514

(22) Filed: Aug. 22, 2023

(65) Prior Publication Data
US 2024/0084626 A1    Mar. 14, 2024

(30) Foreign Application Priority Data
Sep. 9, 2022  (CN) .......................... 202222410207.9

(51) Int. Cl.
E05B 85/16    (2014.01)
B60Q 1/26     (2006.01)

(52) U.S. Cl.
CPC ............ *E05B 85/16* (2013.01); *B60Q 1/2669* (2013.01)

(58) Field of Classification Search
CPC .......... E05B 85/10; E05B 85/14; E05B 85/16; E05B 85/18; E05B 81/76; E05B 81/77; E05B 81/78; E05B 17/10; B60Q 1/2669
See application file for complete search history.

(56) References Cited

U.S. PATENT DOCUMENTS

| | | | | |
|---|---|---|---|---|
| 6,769,154 B1 * | 8/2004 | Klein | ...................... | E05B 81/76 16/110.1 |
| 7,049,940 B2 * | 5/2006 | Ieda | ........................ | E05B 81/78 340/425.5 |
| 7,244,054 B2 * | 7/2007 | Chou | ........................ | B60Q 1/38 362/545 |
| 7,270,452 B2 * | 9/2007 | Wang | ................... | G02B 6/0081 362/540 |
| 7,455,437 B2 * | 11/2008 | Shi | ........................ | B60Q 1/2669 362/540 |

(Continued)

FOREIGN PATENT DOCUMENTS

| CN | 111101786 B | 1/2024 |
|---|---|---|
| WO | 2020048858 A1 | 3/2020 |

*Primary Examiner* — Kristina R Fulton
*Assistant Examiner* — Noah Horowitz
(74) *Attorney, Agent, or Firm* — McAndrews, Held & Malloy, Ltd.

(57) ABSTRACT

The present disclosure provides a door handle assembly for a vehicle comprising a handle seat, a handle cover, an illumination unit, and a sealing element. The handle seat comprises a cavity and an opening connecting with the cavity. The handle cover covers the opening of the handle seat to close the cavity, and the handle cover comprises a light-transmitting area made of a light-transmitting material. The illumination unit is held in the cavity, and the illumination unit comprises a housing and an illumination element enclosed in the housing. The housing comprises a front wall facing the handle cover, and the front wall is made of the light-transmitting material. The sealing element is clamped between the front wall and the handle cover and arranged around the light-transmitting area of the handle cover to seal a gap between the front wall and the light-transmitting area of the handle cover from the outside.

20 Claims, 6 Drawing Sheets

(56) References Cited

U.S. PATENT DOCUMENTS

| | | | | |
|---|---|---|---|---|
| 7,635,210 | B2* | 12/2009 | Metros | B60Q 1/2669 |
| | | | | 362/540 |
| 8,579,481 | B2* | 11/2013 | Minter | E05B 41/00 |
| | | | | 340/5.72 |
| 9,249,606 | B2* | 2/2016 | Naka | H01Q 1/3241 |
| 11,692,378 | B2* | 7/2023 | Yoshida | E05B 85/16 |
| | | | | 292/336.3 |
| 11,739,572 | B2 | 8/2023 | Kuniyil | |
| 2003/0147253 | A1* | 8/2003 | Shy | B60Q 1/28 |
| | | | | 362/540 |
| 2006/0282987 | A1* | 12/2006 | Shih | E05B 85/10 |
| | | | | 16/412 |
| 2007/0258258 | A1* | 11/2007 | Wang | E05B 17/10 |
| | | | | 362/501 |
| 2009/0147528 | A1* | 6/2009 | Wang | B60Q 1/2669 |
| | | | | 362/501 |
| 2017/0159333 | A1 | 6/2017 | Beck | |
| 2020/0354996 | A1 | 11/2020 | Bresser | |
| 2023/0133814 | A1 | 5/2023 | Kuniyil | |

\* cited by examiner

DOOR HANDLE ASSEMBLY

RELATED APPLICATION

The present application claims the benefit of Chinese Patent Application No. CN 2022224102079, filed Sep. 9, 2022, the contents of which are hereby incorporated by reference.

TECHNICAL FIELD

The present disclosure generally relates to a door handle assembly for a vehicle, and more particularly, to a door handle assembly for an external door.

BACKGROUND

For some vehicle door handles (for example, a hidden door handle), in order to make it easy for an operator to operate a door handle in a dim light environment, an illumination module may be provided in the door handle to illuminate an operating environment when the operator operates the door handle. For some vehicle door handles, an illumination module may be provided on the door handle to enhance the futuristic feel of the door handle.

SUMMARY OF THE DISCLOSURE

The present disclosure relates generally to a door handle assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION OF EMBODIMENTS

Figure 1A:
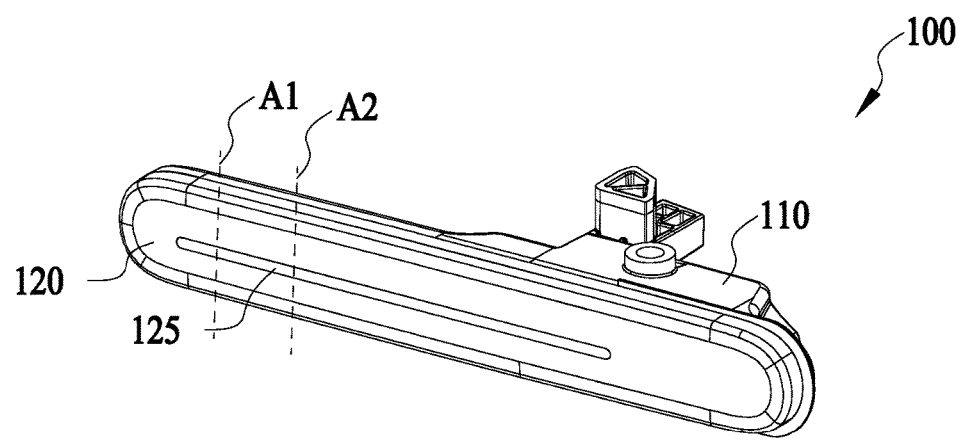
FIG. 1A is a perspective view of a door handle assembly for a vehicle according to an embodiment of the present disclosure.

Various specific embodiments of the present disclosure are described below with reference to the accompanying drawings which constitute part of this description. It should be understood that although the terms indicating directions, such as "front", "rear", "upper", "lower", "left", "right", "top", and "bottom" are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are merely illustrative and should not be considered as limitations.

The present disclosure provides a door handle assembly for a vehicle comprising a handle seat, a handle cover, an illumination unit, and a sealing element. The handle seat comprises a cavity and an opening connecting with the cavity. The handle cover covers the opening of the handle seat to close the cavity, and the handle cover comprises a light-transmitting area made of a light-transmitting material. The illumination unit is held in the cavity, and the illumination unit comprises a housing and an illumination element enclosed in the housing. The housing comprises a front wall facing the handle cover, and the front wall is made of the light-transmitting material. The sealing element is clamped between the front wall and the handle cover and arranged around the light-transmitting area of the handle cover to seal a gap between the front wall and the light-transmitting area of the handle cover from the outside.

According to the above door handle assembly, the sealing element is integrally molded on the front wall of the housing.

According to the above door handle assembly, the sealing element is arranged along an edge of the front wall.

According to the above door handle assembly, the handle cover is provided with a rib on a rear side thereof facing the illumination unit, and the rib is located outside of the sealing element.

According to the above door handle assembly, the rib abuts against the sealing element.

According to the above door handle assembly, the handle cover comprises a lengthwise direction and a widthwise direction, the lengthwise direction of the handle cover being the same with a lengthwise direction of a vehicle, the rib comprising a first rib disposed above the sealing element, and the first rib extending along the lengthwise direction of the handle cover.

According to the above door handle assembly, the handle cover is removably connected to the handle seat by means of snap fit.

According to the above door handle assembly, the handle seat comprises elastic arms arranged in the cavity, the illumination unit being held in the cavity by the elastic arms.

According to the above door handle assembly, the handle cover comprises a lengthwise direction and a widthwise direction, the lengthwise direction of the handle cover being the same with a lengthwise direction of a vehicle, and the light-transmitting area being in a form of a strip extending along the lengthwise direction of the handle cover.

According to the above door handle assembly, the illumination element comprises a plurality of lamp beads arranged along the lengthwise direction of the handle cover. The light-transmitting area is staggered from the plurality of lamp beads in the widthwise direction of the handle cover so that the plurality of lamp beads are not visible through the light-transmitting area from outside the handle cover.

Figure 1B:
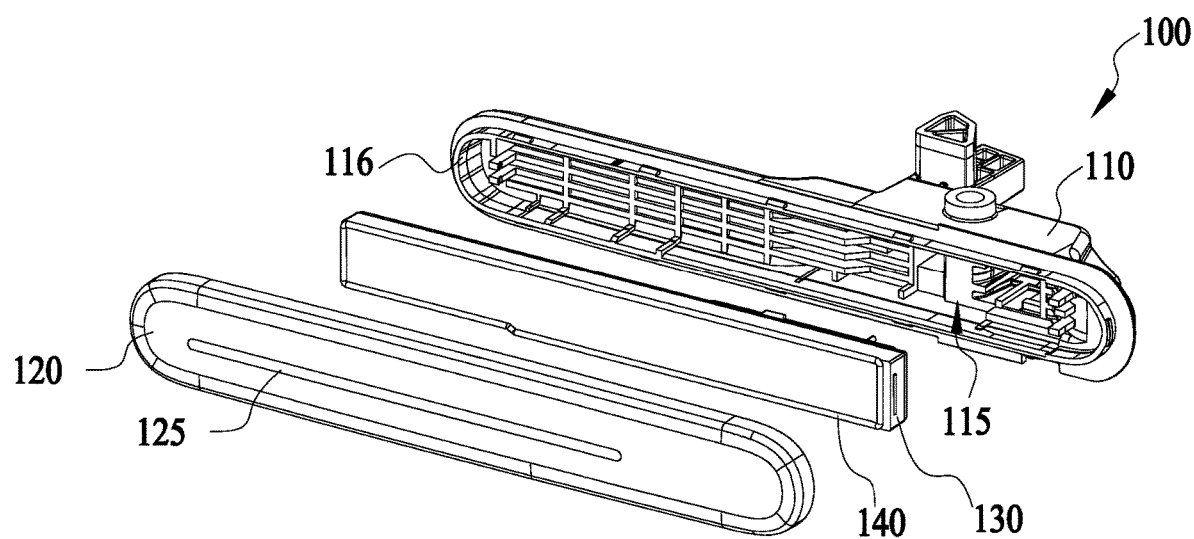
FIG. 1B is an exploded view of the door handle assembly for a vehicle shown in FIG. 1A.

FIGS. 1A and 1B show an overall structure of a door handle assembly 100 for a vehicle according to an embodiment of the present disclosure. FIG. 1A is a perspective view of the door handle assembly 100, and FIG. 1B is an exploded view of the door handle assembly 100. As shown in FIGS. 1A and 1B, the door handle assembly 100 comprises a handle seat 110, a handle cover 120 and an illumination unit 130. The door handle assembly 100 is entirely in a form of a strip, and the handle cover 120 and the illumination unit 130 are also in a form of a strip. The handle seat 110 comprises a cavity 115 and an opening 116 connecting with the cavity 115. The illumination unit 130 is disposed in the cavity 115 of the handle seat 110 through the opening 116 and is held in the cavity 115. The handle cover 120 covers the opening 116 of the handle seat 110 to close the cavity 115. The handle cover 120 is removably connected to the handle seat 110 by means of snap fit so as to enclose the illumination unit 130 in the handle seat 110. The handle cover 120 comprises a light-transmitting area 125. The light-transmitting area 125 is made of a light-transmitting material so that illuminating light rays generated by the illumination unit 130 are visible through the light-transmitting area 125. Therefore, the door handle assembly 100 can provide illumination to the outside of a door handle to facilitate identification of the door handle.

The door handle assembly 100 further comprises a sealing element 140. The sealing element 140 is arranged between the illumination unit 130 and the handle cover 120 to seal a gap between the illumination unit 130 and the handle cover 120, which will be described in detail below.

Figure 2A:
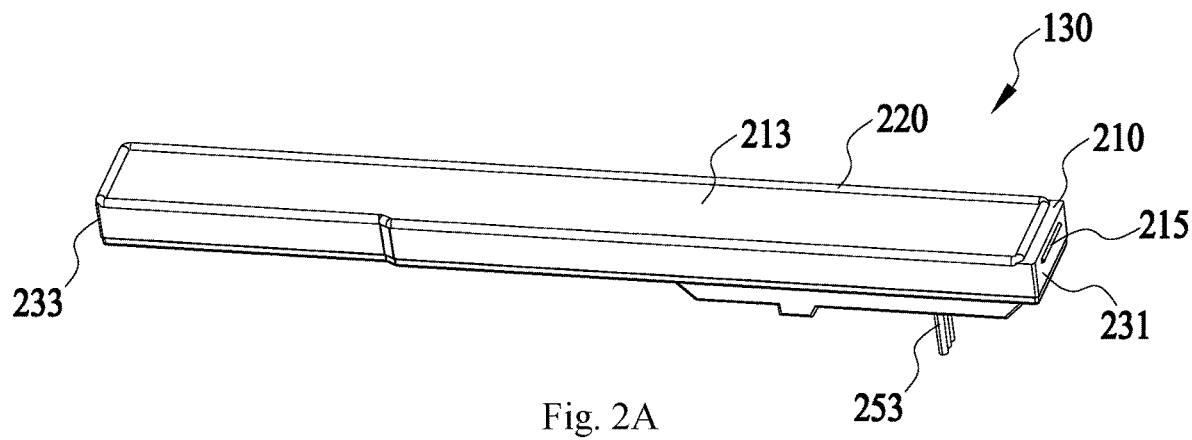
FIG. 2A is a perspective view of a first view of an illumination unit of the door handle assembly for a vehicle shown in FIG. 1A.
Figure 2B:
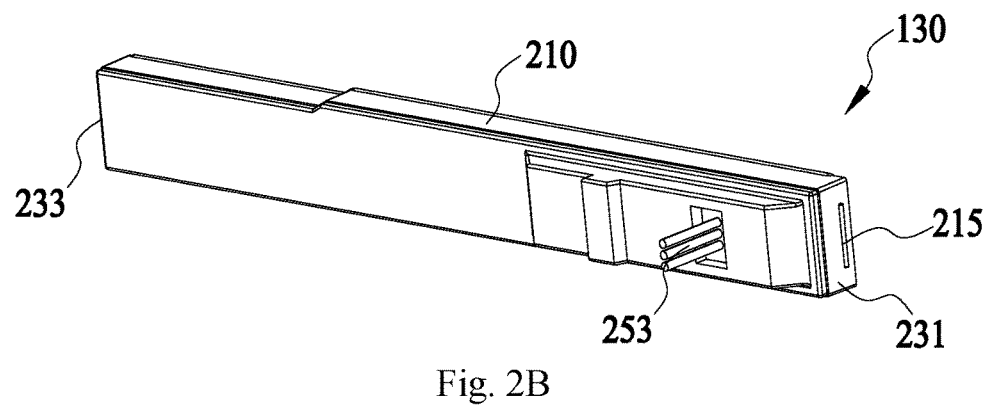
FIG. 2B is a perspective view of a second view of the illumination unit of the door handle assembly for a vehicle shown in FIG. 1A.
Figure 2C:
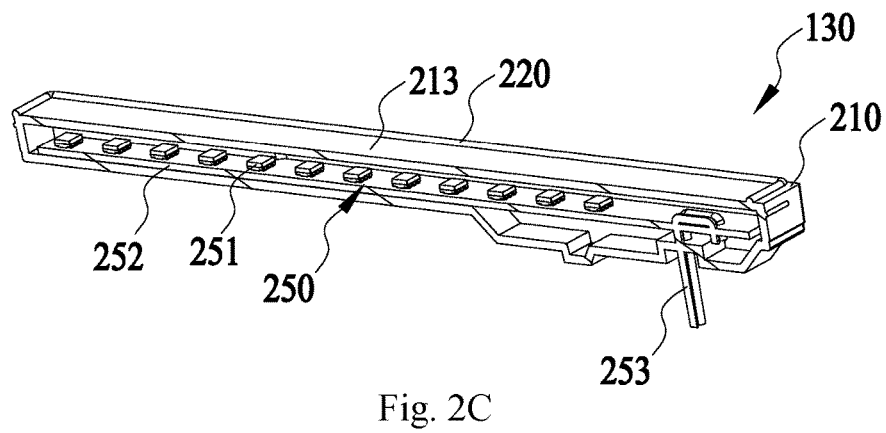
FIG. 2C is a cutaway perspective view of the illumination unit of the door handle assembly for a vehicle shown in FIG. 1A.

FIGS. 2A-2C show a specific structure of the illumination unit 130, among which FIG. 2A is a perspective view of a first view (from front to rear) of the illumination unit 130, FIG. 2B is a perspective view of the illumination unit 130 from a second view (from rear to front), and FIG. 2C is a cutaway perspective view of the illumination unit 130. As shown in FIGS. 2A-2C, the illumination unit 130 comprises a housing 210 and an illumination element 250 enclosed in the housing 210. The illumination element 250 comprises a plurality of LED lamp beads 251, which emit light when energized to produce illuminating light rays. The illumination element 250 further comprises a circuit board 252 and a harness 253 connecting the circuit board 252 to an external power source. The LED lamp beads 251 are supported by the circuit board 252, and are arranged along the lengthwise direction of the illumination unit 130. The circuit board 252 comprises a control circuit that can control the power-on/off and lighting mode of the LED lamp beads. For example, by receiving an instruction from a vehicle control system, the control circuit can control the LED light beads to achieve different lighting modes according to pre-set scenes.

The housing 210 of the illumination unit 130 is generally cuboid-shaped, and comprises a front wall 213 facing the handle cover 120. The housing 210 is entirely made of a hard supporting material (for example, PC plastic), and is made of a light-transmitting material at least on the front wall 213 thereof. Of course, the housing 210 may also be entirely made of a light-transmitting material. The housing 210 further comprises a pair of width sidewalls 231, 233. The pair of width sidewalls 231, 233 are provided with a strip rib 215 respectively, and the strip rib 215 extends along the widthwise direction of the housing 210.

In the embodiment shown in the drawings, the sealing element 140 is molded in one piece on the front wall 213 of the housing 210 of the illumination unit 250 by means of secondary injection molding. The sealing element 140 extends along the edge of the front wall 213 and forms a closed shape. That is, the sealing element 140 extends along the entire circumference of the front wall 213 of the housing 210.

Figure 3A:
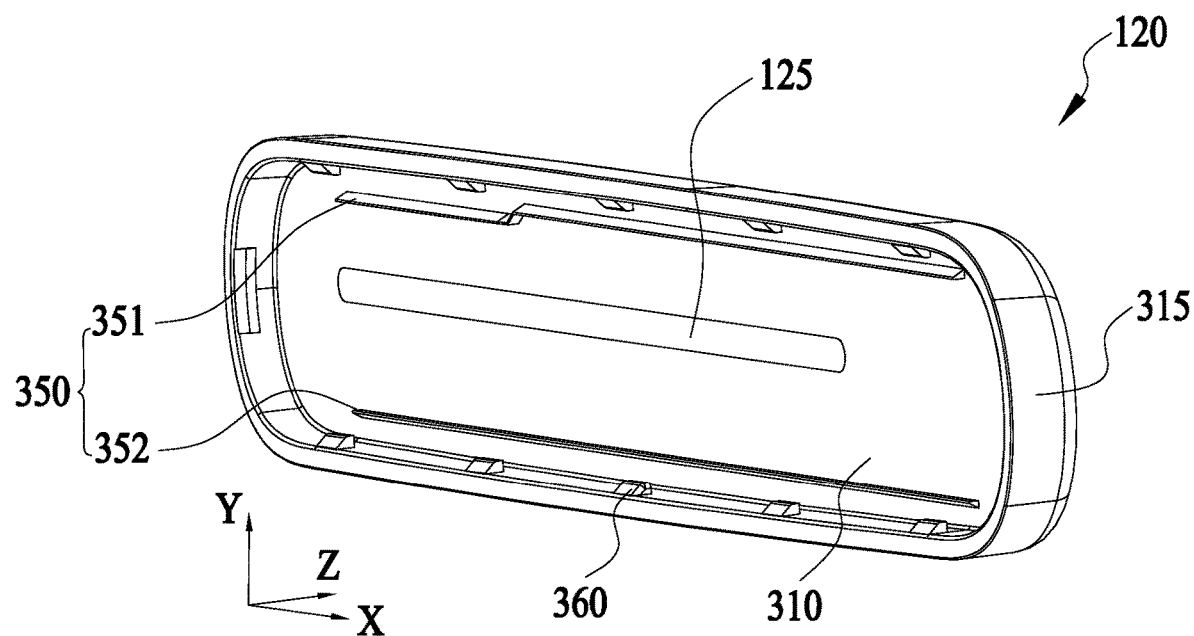
FIG. 3A is a rear perspective view of a handle cover of the door handle assembly for a vehicle shown in FIG. 1A.
Figure 3B:
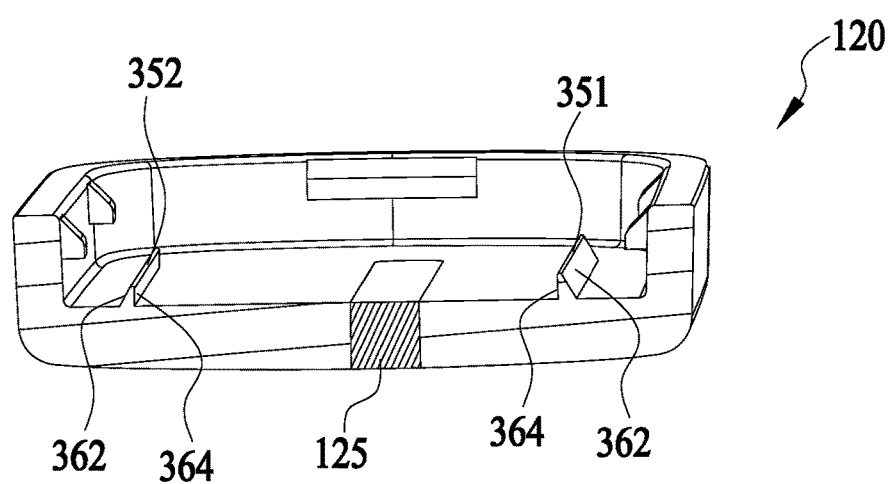
FIG. 3B is a cutaway perspective view of the handle cover of the door handle assembly for a vehicle shown in FIG. 1A.

FIGS. 3A and 3B show a specific structure of the handle cover 120, among which FIG. 3A is a rear perspective view of the handle cover 120, and FIG. 3B is a cutaway perspective view of the handle cover 120. As shown in FIGS. 3A and 3B, the handle cover 120 comprises a lengthwise direction (i.e., the X direction in FIG. 3A) and a widthwise direction (i.e., the Y direction in FIG. 3A), and the lengthwise direction of the handle cover 120 is the same with the lengthwise direction of a vehicle. The handle cover 120 comprises a cover body 310 and a cover rim 315, and the cover rim 315 protrudes backward from the cover body 310 and extends around the cover body 310. The handle cover 120 is connected to the handle seat 110 by means of the cover rim 315. The light-transmitting area 125 forms a part of the cover body 310. In some embodiments, the cover body 310 and the cover rim 315 are formed in one piece from, for example, a PC plastic/ABS material, and the light-transmitting area is formed from, for example, a Si—PC light-transmitting material.

The handle cover 120 further comprises ribs 350 that are arranged on the rear side of the handle cover 120 facing the illumination unit 130. In the embodiment shown in the drawings, the ribs 350 are on the rear side of the cover body 310 and extends backward from the cover body 310. The ribs 350 comprise a first rib 351 and a second rib 352 provided above and below the light-transmitting area 125, respectively. The first rib 351 and the second rib 352 extend along the lengthwise direction of the handle cover 120, and the extending length thereof is substantially the same as that of the housing 210 of the illumination unit 130 or greater than that of the housing 210 of the illumination unit 130, so that the first rib 351 and the second rib 352 can act as water stoppers for blocking a water flow or water vapor from flowing into the gap between the front wall 213 of the housing 210 of the illumination unit 130 and the light-transmitting area 125 of the handle cover 120. The first rib 351 and the second rib 352 each comprises a blocking surface 364 and a guide surface 362 that are arranged opposite each other. The blocking surface 364 faces the sealing element 140 (see FIGS. 5A and 5B), and the guide surface 362 faces away from the sealing element 140. The guide surface 362 is arranged at an angle relative to the blocking surface 364, and is configured to guide a water flow or water vapor along a predetermined path to prevent the water flow or water vapor from flowing into the gap between the front wall 213 of the housing 210 of the illumination unit 130 and the light-transmitting area 125 of the handle cover 120.

The handle cover 120 further comprises a plurality of cover grippers 360 provided on the inner side of the cover rim 315 to achieve snap-fit connection between the handle cover 120 and the handle seat 110. The plurality of cover grippers 360 are evenly provided along long sides of the cover rim 315, and are symmetrically arranged on the two long sides of the cover rim 315 relative to the cover body 310. Each of the cover grippers 360 is a protrusion that protrudes inward from the cover rim 315, and the cover gripper together with the cover rim 315 form a hook-like structure (see FIGS. 5A and 5B).

Figure 4A:
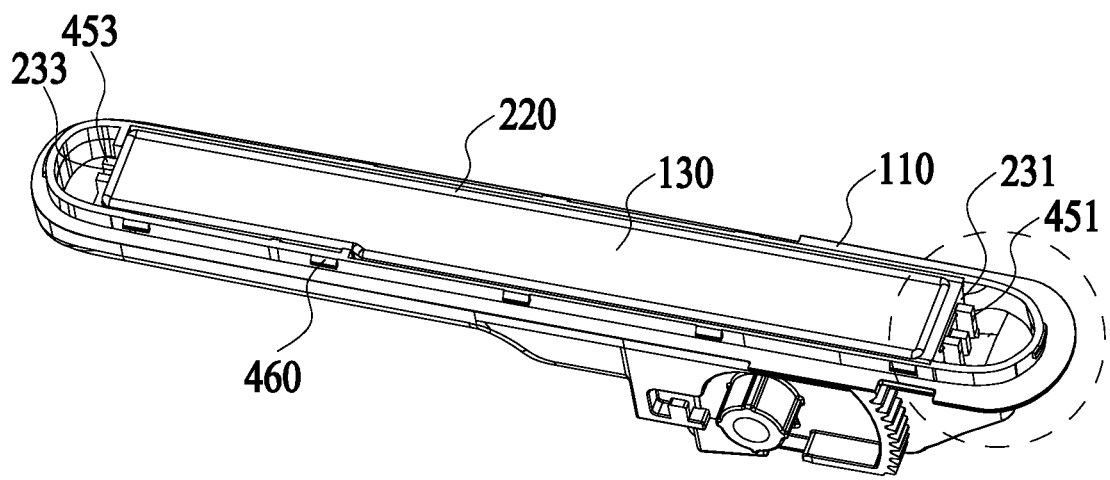
FIG. 4A is an assembly view of the illumination unit and a handle seat of the door handle assembly for a vehicle shown in FIG. 1A.
Figure 4B:
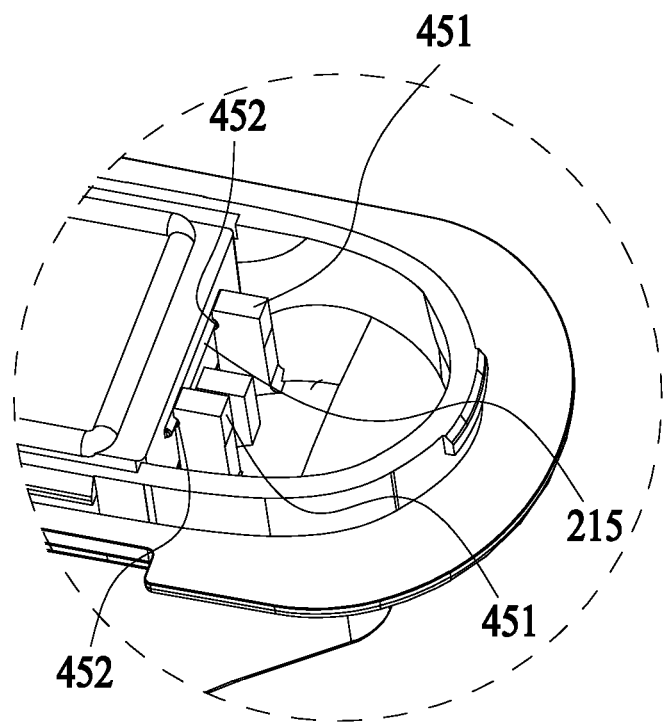
FIG. 4B is a partial enlarged view of FIG. 4A.

FIG. 4A is an assembly view of the illumination unit 130 and the handle seat 110, and FIG. 4B is a partially enlarged view of a portion enclosed by dashed lines in FIG. 4A. As shown in FIGS. 4A and 4B, elastic arms are provided in the cavity 115 of the handle seat 110. The elastic arms comprises first side elastic arms 451 and second side elastic arms 453 that are arranged on the opposite sides of the illumination unit 130. The distance between the first side elastic arms 451 and the second side elastic arms 453 matches the distance between the pair of width sidewalls 231 and 233 of the housing 210 of the illumination unit 130 so that the illumination unit 130 can be disposed between and in contact with the first side elastic arms 451 and the second side elastic arms 453. Two first side elastic arms 451 and two second side elastic arms 453 are provided, and the inner side of each of the elastic arms is provided with a notch 452 facing the corresponding width sidewall 231/233. The strip rib 215 of the pair of width sidewalls 231 and 233 of the housing 210 can be received in the notch 452 on the corresponding elastic arm, so that the illumination unit 130 can be held in the cavity 115 of the handle seat 110 by means of the first side elastic arms 451 and the second side elastic arms 453.

As shown in FIG. 4A, the handle seat 110 comprises a plurality of seat grippers 460 arranged on the peripheral surface thereof. The seat grippers are configured to cooperate with the cover grippers 360 on the handle cover 120 to achieve the snap-fit connection between the handle cover 120 and the handle seat 110. The plurality of seat grippers 460 are evenly provided along long sides of the handle seat 110, and are symmetrically arranged relative to the cavity 115. Each of the seat grippers 460 is a protrusion that protrudes outward from the peripheral surface of the handle seat 110, and the seat gripper together with the handle seat 110 form a hook-like structure (see FIGS. 5A and 5B). The number and arrangement positions of the seat grippers 460 match those of the cover grippers 360, and each of the seat grippers 460 engages (or meshes) with a corresponding cover gripper 360, thereby achieving snap-fit connection between the handle cover 120 and the handle seat 110.

Figure 5A:
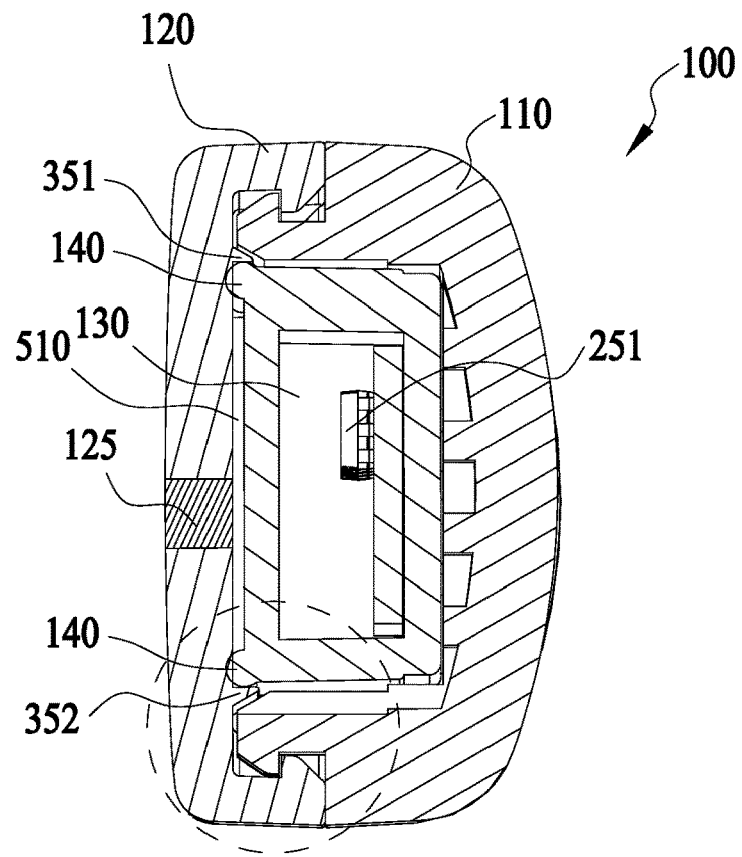
FIG. 5A is a cutaway view in a first position of the door handle assembly for a vehicle shown in FIG. 1A.
Figure 5B:
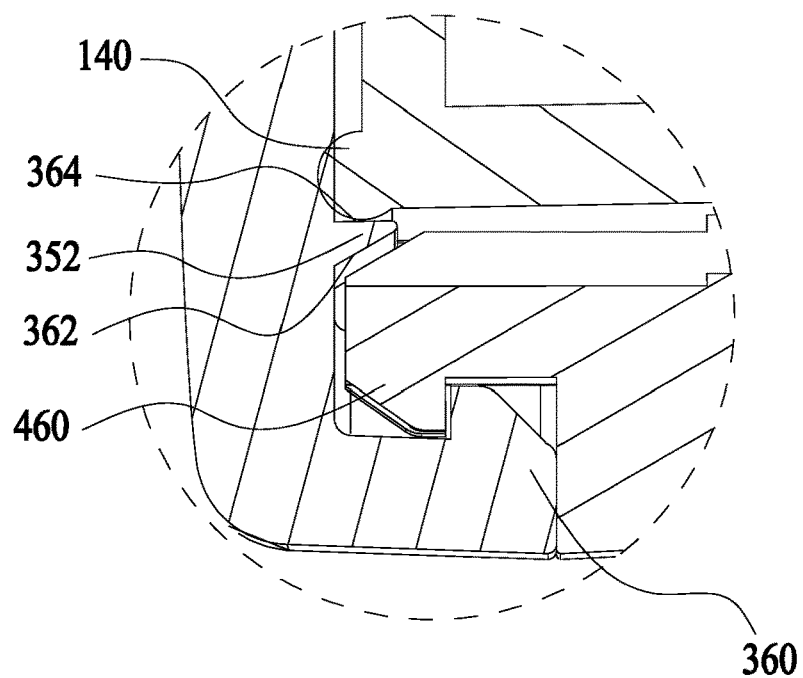
FIG. 5B is a partially enlarged view of a portion enclosed by dashed lines in FIG. 5A.
Figure 5C:
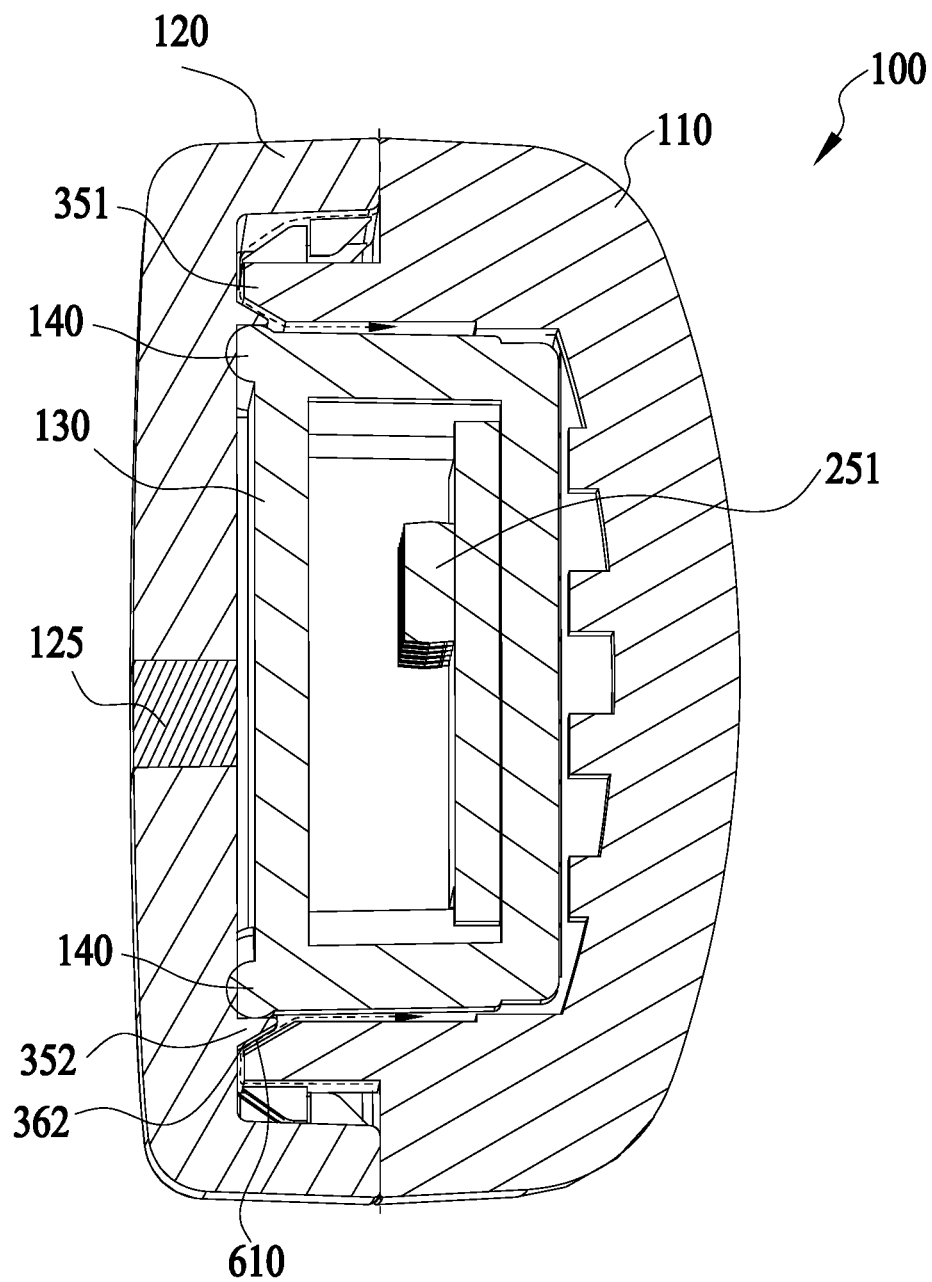
FIG. 5C is a cutaway view in a second position of the door handle assembly for a vehicle shown in FIG. 1A.

FIG. 5A is a cutaway view in a first position A1 of the door handle assembly 100 shown in FIG. 1A, wherein the first position A1 passes through a cover gripper 360 and a seat gripper 460 that cooperate with each other. FIG. 5B is a partially enlarged view of a portion enclosed by dashed lines in FIG. 5A. FIG. 5C is a cutaway view in a second position A2 of the door handle assembly 100 shown in FIG. 1A. The second position A2 does not pass through the cover gripper 360 and the seat gripper 460 that cooperate with each other.

As shown in FIGS. 5A-5C, when the handle seat 110, the handle cover 120 and the illumination unit 130 are assembled in position, the illumination unit 130 is enclosed in the cavity 115 of the handle seat 110 by the handle cover 120. The sealing element 140 is clamped between the front wall 213 of the housing 210 of the illumination unit 130 and the handle cover 120, and extends around the light-transmitting area 125 of the handle cover 120. Therefore, the sealing element 140 seals the gap 510 between the front wall 213 and the light-transmitting area 125 of the handle cover 120 from the outside. The first rib 351 and the second rib 352 are disposed outside the sealing element 140 and abut against the sealing element 140. As shown in FIGS. 5A and 5B, the blocking surface 364 of the first rib 351 and the blocking surface of the second rib 352 are in contact with the sealing element 140. As shown in FIG. 5C, a predetermined guide path 610 is formed between the guide surfaces 362 of the first rib 351 and the second rib 352 and the handle seat 110. Through the guidance of the guide path 610, a water flow or water vapor entering the gap between the handle seat 110 and the handle cover 120 can bypass the gap 510 between the front wall 213 and the light-transmitting area 125 of the handle cover 120. A flowing path of water flow or water vapor entering the gap between the handle seat 110 and the handle cover 120 is shown by the dashed lines in FIG. 5C.

As shown in FIGS. 5A and 5C, the light-transmitting area 125 of the handle cover 120 is staggered from the plurality of lamp beads 251 in the widthwise direction of the handle cover 120 so that the plurality of lamp beads 251 are not visible through the light-transmitting area 125 from outside the handle cover 120. In the embodiment shown in the drawings (for example, FIG. 2C), the plurality of LED light beads 251 are arranged in a straight line along the lengthwise direction of the handle cover 120, and are all disposed above the light-transmitting area 125.

By enclosing the illumination element 250 with a hard housing 210 and providing the sealing element 140 between the hard housing 210 and the handle cover 120 and around the light-transmitting area 125 of the handle cover 120, the door handle assembly 100 for a vehicle according to the present disclosure can prevent a water flow or water vapor from entering the gap behind the light-transmitting area 125 of the handle cover 120 to ensure the effect of transmitting light rays through the light-transmitting area 125. In addition, the present disclosure also provides ribs as water stoppers, and when the sealing element 140 is aged due to too long use time, the ribs can prevent a water flow or water vapor from entering the gap behind the light-transmitting area 125 of the handle cover 120 to ensure the effect of transmitting light rays through the light-transmitting area 125.

Although the present disclosure is described with respect to the examples of the embodiments outlined above, various alternatives, modifications, variations, improvements, and/or substantial equivalents that are known or current or to be anticipated later may be apparent to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to include all known or earlier developed alternatives, modifications, variations, improvements and/or substantial equivalents.

What is claimed is:
1. A door handle assembly for a vehicle, comprising:
a handle seat comprising a cavity and an opening connecting with the cavity;
a handle cover covering the opening of the handle seat to close the cavity, the handle cover comprising a light-transmitting area made of a light-transmitting material;
an illumination unit being held in the cavity, the illumination unit comprising a housing and an illumination element enclosed in the housing, the housing compris- ing a front wall facing the handle cover, and the front wall being made of the light-transmitting material; and a sealing element being clamped between the front wall and the handle cover and arranged around the light-transmitting area of the handle cover to seal a gap between the front wall and the light-transmitting area of the handle cover.

2. The door handle assembly according to claim 1, wherein the sealing element is integrally molded on the front wall of the housing.

3. The door handle assembly according to claim 1, wherein the sealing element is arranged along an edge of the front wall.

4. The door handle assembly according to claim 1, wherein the handle cover is provided with at least one rib on a rear side thereof facing the illumination unit, and at least one rib is located outside of the sealing element.

5. The door handle assembly according to claim 4, wherein at least one rib abuts against the sealing element.

6. The door handle assembly according to claim 5, wherein the handle cover comprises a lengthwise direction and a widthwise direction, the lengthwise direction of the handle cover being the same with a lengthwise direction of a vehicle, at least one rib comprising a first rib disposed above and abutting the sealing element, and the first rib extending along the lengthwise direction of the handle cover.

7. The door handle assembly of claim 6, wherein the at least one rib includes a second rib disposed below and abutting the sealing element and the second rib extends along the lengthwise direction of the handle cover.

8. The door handle assembly of claim 7, wherein at least one of the first rib or the second rib includes a blocking surface and a guide surface opposite the blocking surface, wherein the blocking surface abuts the sealing element.

9. The door handle assembly of claim 8, wherein the guide surface is arranged at an angle relative to the blocking surface, and is configured to guide a flow of water or water vapor along a predetermined path to prevent the water flow or water vapor from flowing into the gap.

10. The door handle assembly of claim 8, wherein the guide surface is configured to guide a flow of water or water vapor along a predetermined path to prevent the water flow or water vapor from flowing into the gap.

11. The door handle assembly of claim 8, wherein each of the first rib and the second rib, wherein the blocking surface of each rib abuts the sealing element, and wherein the guide surface of each rib is configured to guide a flow of water or water vapor along a predetermined path to prevent the water flow or water vapor from flowing into the gap.

12. The door handle assembly according to claim 1, wherein the handle cover is removably connected to the handle seat by means of snap fit.

13. The door handle assembly according to claim 1, wherein the handle seat comprises elastic arms arranged in the cavity, the illumination unit being held in the cavity by the elastic arms.

14. The door handle assembly according to claim 1, wherein the handle cover comprises a lengthwise direction and a widthwise direction, the lengthwise direction of the handle cover being the same with a lengthwise direction of a vehicle, and the light-transmitting area being in a form of a strip extending along the lengthwise direction of the handle cover.

15. The door handle assembly according to claim 14:
wherein the illumination element comprises a plurality of lamp beads arranged along the lengthwise direction of the handle cover; and
wherein the light-transmitting area is staggered with the plurality of lamp beads in the widthwise direction of the handle cover so that the plurality of lamp beads is not visible through the light-transmitting area from outside the handle cover.

16. The door handle assembly according to claim 1, wherein the illumination comprises a plurality of lamp beads configured to be controlled by a control circuit to achieve a plurality of different lighting modes.

17. The door handle assembly according to claim 16, wherein the door handle assembly includes the control circuit.

18. The door handle assembly according to claim 17, wherein the control circuit is on circuit board that supports the plurality of lamp beads.

19. The door handle assembly according to claim 1, wherein the housing is entirely made of light-transmitting material.

20. The door handle assembly of claim 1, wherein the sealing element is molded in one piece on the front wall of the housing of the illumination unit.

* * * * *